APPARATUS FOR RECORDING A MODULATED CARRIER UPON FILM

Filed Feb. 28, 1961 2 Sheets-Sheet 1

INVENTOR.
ABRAHAM A. GOLDBERG
BY
Brumbaugh, Free, Graves & Donohue
his ATTORNEYS

APPARATUS FOR RECORDING A MODULATED CARRIER UPON FILM

Filed Feb. 28, 1961 2 Sheets-Sheet 2

INVENTOR.
ABRAHAM A. GOLDBERG
BY
Brumbaugh, Free, Graves & Donohue
his ATTORNEYS

United States Patent Office 3,151,215
Patented Sept. 29, 1964

3,151,215
APPARATUS FOR RECORDING A MODULATED CARRIER UPON FILM

Abraham A. Goldberg, Stamford, Conn., assignor to Columbia Broadcasting System, Inc., New York, N.Y., a corporation of New York Filed Feb. 28, 1961, Ser. No. 92,366
5 Claims. (Cl. 178—6.7)

This invention generally relates to recording techniques, and, more particularly, to the technique of recording video information upon photographic film.

In the recording on film of video signals representative of picture information, it has been proposed heretofore to modulate the frequency of a film-exposing beam of light, whose intensity is varying, in accordance with signals derived from television pickup equipment. Such a recording technique is disclosed in a copending patent application of Peter C. Goldmark and Renville H. McMann, Jr., Serial No. 77,916, filed December 23, 1960, for "Film Recording Reproducing Apparatus." The technique results in the production of a series of dotted lines extending transversely across the film, each line on the film corresponding to an associated line scan in a television pickup tube. In each line on the film the spacing between adjacent dots, i.e., the frequency at which the dots are placed in a line, is a function of the instantaneous frequency of a carrier signal modulated by signals from television pickup equipment. By thus recording video information on film, the effects of the nonlinear light transmissivity characteristic of the film, or other nonlinear characteristics of the playback system, are virtually eliminated inasmuch as these characteristics are not used to carry directly the recorded information.

The human mind, however, is not trained to recognize picture images recorded in this fashion, but is only able to recognize images recorded on film in which the light transmissivity at various points in the film varies in accordance with the aspect of the picture recorded. For the purpose of simple editing of films, it is desirable that such film records be recognizable by human editors without the use of added reproducing and decoding equipment.

Accordingly, it is an object of this invention to record picture information on a record medium in a primary recording mode, not dependent upon nonlinear characteristics of the record medium and not necessarily resulting in a recognizable image, and in a secondary recording mode lending a recognizable aspect to the record medium.

Broadly speaking, this object is achieved in the present invention by applying a composite signal to the beam intensity control element of a flying spot scanner used to expose photographic film. The composite signal is formed from a carrier signal, whose frequency is modulated by an amplitude varying output signal from a television pickup tube, and from the output signal itself. The frequency modulated portion of the composite signal is the primary conveyor of information, resulting, e.g., in the variable spacing of opaque dots on the film, while the output signal from the pickup tube comprises the secondary conveyor of editing information that varies the light transmissivity of the film at different portions thereof to create a recognizable image. In this manner, the advantages of frequency modulation are retained, and, in a reproducing mode, information is "read" off the film by electronic apparatus operating only upon the frequency modulated portion of the record, i.e., upon the variably spaced dots. At the same time, for the purpose of editing, the picture is easily recognizable.

Such a composite signal may be advantageously generated, for example, by adding together a carrier signal, frequency modulated by the amplitude varying output signal from a television pickup tube, and the output signal itself. By adding the two signals, the mean value about which the frequency modulated carrier signal varies is made to vary in accordance with the signal from the television pickup tube, and thus a varying average intensity of the film exposing frequency modulated beam of light is produced.

Although the invention has been described generally above, a better understanding of it may be obtained from the following detailed description when taken in conjunction with the appended drawings in which.

Figures 1, 2:
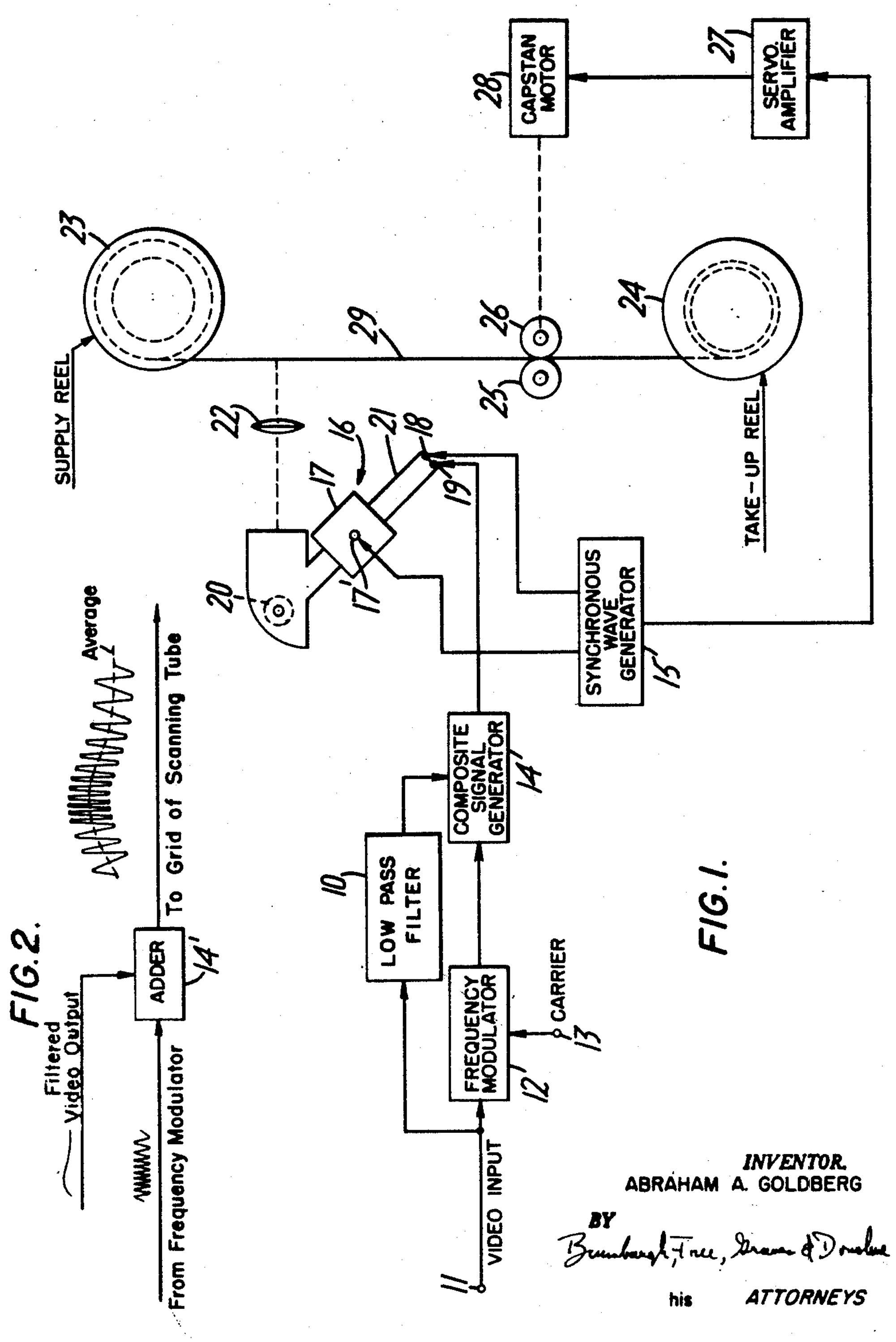
FIG. 1 is a block diagram of apparatus constructed according to the invention.
FIG. 2 is a block diagram of one form of the composite signal generator of FIG. 1, showing also the waveforms of the input and output signals.

Turning now to FIG. 1, a composite video signal, consisting of picture information and standard synchronizing pulses from a television pickup tube and other television program transmitting equipment (not shown), is applied to an input terminal 11. In the composite video signal, the picture information is represented as variations in the magnitude of the signal, and, according to conventional U.S. standards, is presented in the form of 60 fields (30 interlaced pictures) per second at the standard horizontal line scanning frequency of 15,750 lines per second.

The video input signal is applied to a frequency modulator 12 and also to a low pass filter 10. Also applied to the frequency modulator 12 at input terminal 13 is a carrier signal from a signal source (not shown). The frequency of the carrier signal may be, say, 5 megacycles, and within the modulator 12 the carrier is modulated in such a fashion that maximum amplitudes of the video input signal, corresponding to white portions of a television picture, shift the frequency of the carrier signal to, say, 6 megacycles. By the same token, the minimum amplitudes of the input signal, corresponding to the synchronization tips of the signal, shift the carrier frequency to, say, 4 megacycles. In this manner, the output signal from the frequency modulator 12 comprises the carrier signal frequency modulated by the magnitude of the video input signal.

The frequency modulated signal is applied to one input of composite signal generator 14. Applied to the other input of the generator is the signal from input terminal 11 after being filtered in the low pass filter 10. Filtering of the direct video signal to remove the higher frequency components of the signal is desirable to reduce possible interference between the frequency modulated carrier signal and the direct video signal. Thus, for example, if the spectrum of the frequency modulated signal extends from approximately 2 megacycles to 8 megacycles, it may be desirable to restrict the direct video frequencies to less than 2 megacycles. Such a restriction will ultimately affect the aspect of the reproduced image, but it will not do so to the extent of making the image unrecognizable. Furthermore, during a "playback" mode of operation, the reproducing amplifying equipment will reject these low, direct video frequencies, and distortion in this mode will be eliminated.

In the generator 14, the frequency modulated signal and the filtered video input signal are combined to form a composite signal, and the composite signal is applied to terminal 19 to control the beam intensity in a cathode ray tube 16. Before proceeding further in the description, however, it will be advantageous to consider FIG. 2 which shows one form of the composite signal generator 14.

Turning to FIG. 2, the composite signal generator comprises an adder 14′ which serves to add together the signals from the frequency modulator 12 and the low pass filter 10. As may be seen from the figure, the signal from the frequency modulator comprises a sine wave of constant maximum amplitude but of varying frequency, while the filtered video input signal is one whose amplitude slowly varies. In either case, the variations of amplitude and the variations of frequency are both representative of the picture information to be recorded. Thus, the output signal from the adder 14' comprises a sine wave of varying frequency, which results ultimately in variably spaced dots on film, and of varying average value, which results ultimately in a varying average light transmissivity of the film, and thus a recognizable picture.

Returning to FIG. 1, the output signal from the composite signal generator is applied to input terminal 19 of the cathode ray tube 16 which preferably is of the type known as a line scan tube. The line scan tube is similar to a conventional cathode ray tube in that it has a usual electron gun 21 and a horizontal deflection coil 17 that is connected to terminal 17'. The tube 16 differs from a conventional cathode ray tube in that the screen of the tube is provided by a phosphor coating on the peripheral surface of a cylindrical drum 20 located within an evacuated envelope of the tube in front of the electron gun 21. The drum 20 rotates about an axis aligned with the horizontal deflection direction of the electron beam of the tube. During the tube operation, the beam impinges on the phosphor coating of the rotating drum to produce a light spot which is of very small diameter (about 4 mils) but of extreme brilliance. Burnout of the phosphor is prevented by the rotation of the drum to continuously change the portion of the phosphor coating exposed to the beam.

Output signals from the composite signal generator 14, when applied through the terminal 19 to a control grid (not shown) of tube 16, modulate the intensity of the electron beam produced by gun portion 21 of the tube. The intensity modulation of the electron beam in turn causes the luminosity of the spot of light produced to undergo variations which correspond to the variations in instantaneous amplitude undergone by the composite signal impressed on the grid. Preferably, the amplitude of the frequency modulated carrier applied at the terminal 19 is made sufficiently large to cause saturation in the film at both the opaque and transparent limits.

The intensity modulated beam of light from tube 16 is focused by a lens system 22 upon a film 29. The film, which is fed from a supply reel 23 to a takeup reel 24, is driven by a pressure roller 25 engaging a capstan 26 coupled to a driving motor 28. The motor is under the control of a servoamplifier 27, which in turn receives input signals from a synchronous wave generator 15. Different output signals from the synchronous wave generator 15 are also applied to horizontal deflection coil terminal 17' and to a terminal 18 that is connected to the cathode (not shown) of tube 16.

The signals from the synchronous wave generator 15 that are applied to the terminals 17' and 18 of the tube 16 and to the servoamplifier 27 cause the modulated beam of light from the tube to expose the film 29 in a series of succeeding lines transversely across the film, each line corresponding to a line sweep in a television pickup tube. In this respect, the signals that are applied to terminal 18 blank the light beam during the retrace interval when the beam of light is returning across the width of the film from the end of one line scan to the beginning of the next. For the details of the scanning system described generally above, reference should be made to the above-mentioned copending application.

Figure 3:
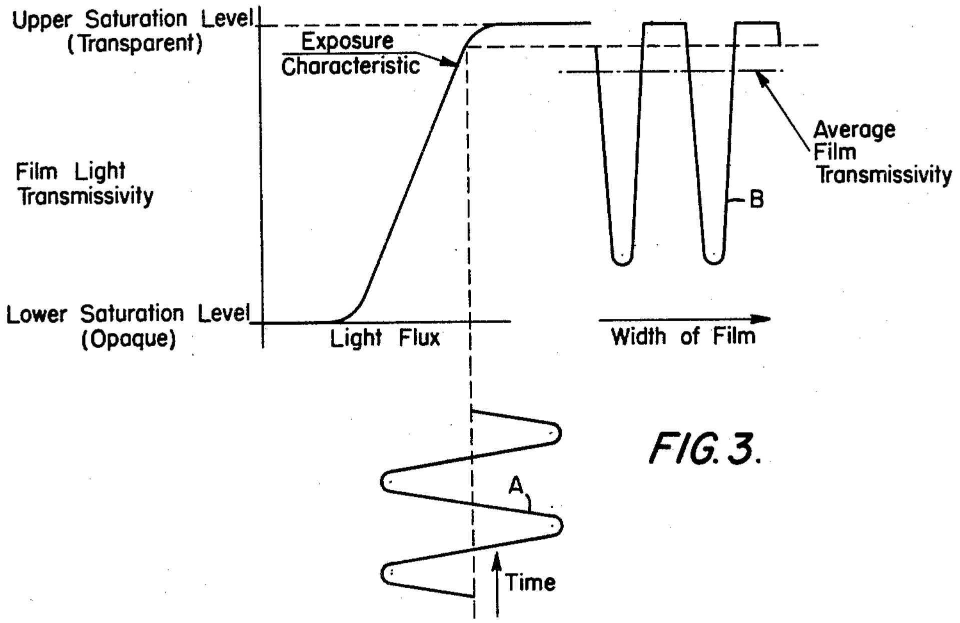
FIGS. 3 and 4 are diagrams useful in understanding the principles of the present invention.
Figure 4:
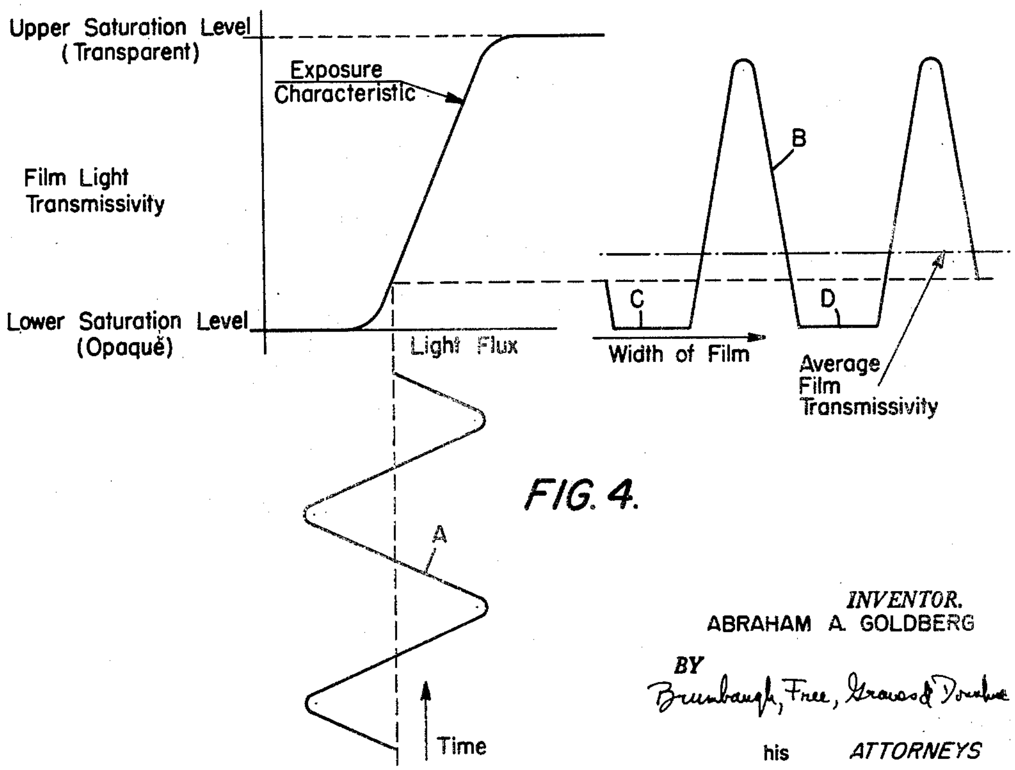

Turning now to FIGS. 3 and 4, a better understanding may be obtained of the aspect of the exposed film 29. In FIG. 3, the variations in luminosity of the light beam from the tube 16 are shown by the curve designated A. In the example chosen, the frequency of the variations of light flux and the average value about which the light flux varies are assumed to correspond to a situation in which the corresponding portion of a television picture is white, and thus, in the case of positive film as the recording medium, to a transparent portion of the film. The light transmissivity at various portions in the film exposed by the light beam is obtained from the exposure characteristic shown in the figure to give the curve designated B. As may be seen from the figure, the light transmissivity of the film varies along the width of the film for these particular variations in light flux from transparency to near opacity. The average light transmissivity of the film, however, is very near complete transparency, and thus the eye viewing the film effectively sees a nearly transparent portion of the film at this point.

On the other hand, referring to FIG. 4, the curve designated A corresponds to a situation in which the frequency of the variations in luminosity of the light beam, and the average value about which the variations occur, correspond to a relatively black portion of a television picture and thus to a relatively opaque portion of the photographic film. Thus, the curve B, giving the light transmissivity of the exposed film at various portions along the width thereof, varies from opacity to near transparency as shown. The average light transmissivity in this case, however, is near opacity, and this is what the eye sees when viewing this portion of the film.

As may be noted, the average light transmissivity of the film varies in any line across the exposed film in accordance with the average light flux impinging upon the film. Such a varying average light transmissivity results in the reproduction of a positive picture, which, because it is composed of an average, is somewhat blurred, but nonetheless easily distinguishable. Still referring to FIG. 4, the spacing on the film of the opaque portions designated C and D is clearly established, and may be easily detected by the apparatus of the copending application above-mentioned to provide a frequency modulated signal for the purpose of reproduction.

Thus, the basic frequency modulation technique is retained, while an average variation is added to provide a visually recognizable picture aspect to the film containing the basic frequency modulated signal. In this way, the detriments of the nonlinear film characteristics are avoided in the primary frequency modulation recording mode, while the benefits are utilized in the secondary recording mode to eliminate the need for complex and elaborate viewing and editing equipment.

Varying the average value of the frequency modulated signal may distort somewhat the spacing of the opaque portions of the film, since, for greater degrees of saturation, the width of each of the opaque portions necessarily increases. However, with proper selection and modification of the signals to be combined, a proper balance may be achieved between providing an undistorted FM record and a sufficiently recognizable picture.

It is to be understood that the invention applies equally well to negative film; i.e., film in which increased light exposure results in decreased light transmissivity in the film after being developed, and to positive film; i.e., film in which increased light exposure results ultimately in increased light transmissivity. In either case, the video signal that is added to the frequency modulated signal may be inverted (180° phase shift) or uninverted (no phase shift) to result in either a positive or negative reproduced picture. Similarly, in either case the frequency modulated signal may be such as to result in the variable spacing of either opaque or transparent dots on the film.

From the description above, it is apparent that numerous additions, substitutions, and modifications of the embodiments shown may be made without, however, departing from the scope of the invention. Such modifications, substitutions, and additions should be deemed to be well within the scope of the following claims which are set forth as follows to define the invention.

What is claimed is:

1. Apparatus for recording information on film comprising means for modulating the frequency of a carrier signal in accordance with the magnitude of an input signal representing information to be recorded thereby to generate a frequency modulated signal, means for combining said input signal and said frequency modulated signal thereby to produce a composite signal, and means for varying the intensity of a beam of light exposing said film in accordance with the magnitude of said composite signal.

2. Apparatus as recited in claim 1 in which said combining means comprises an adder for generating a signal equal to the sum of said input signal and said frequency modulated signal.

3. In apparatus for recording on photographic film graphic information represented by a signal whose amplitude varies in accordance with the information, the combination of means for modulating the frequency of a sine wave signal of fixed maximum amplitude in accordance with the magnitude of said input signal, means for modifying the average value of said sine wave signal in accordance with the magnitude of said input signal, means for varying the intensity of a beam of light in accordance with the instantaneous amplitude of said modified frequency modulated sine wave signal, and means for causing said light beam to impinge in line-by-line fashion upon a photographic film across the width thereof.

4. In apparatus for recording on photographic film graphic information represented by an input signal whose amplitude varies in accordance with the information, the combination of means for modulating the frequency of a sine wave signal of fixed maximum amplitude in accordance with the amplitude of said input signal, means for filtering said input signal to pass portions of said input signal of a frequency less than the lowest significant frequency contained in said frequency modulated sine wave signal, means for modifying the average value of said frequency modulated sine wave signal in accordance with the amplitude of said filtered input signal, means for varying the intensity of a beam of light in accordance with the instantaneous amplitude of said modified frequency modulated sine wave signal, and means for causing said light beam to impinge in line-by-line fashion upon a photographic film across the width thereof.

5. Apparatus for recording information on film comprising means for modulating the frequency of a carrier signal in accordance with the magnitude of an input signal representing information to be recorded thereby to generate a frequency modulated signal, means for filtering said input signal to remove from said input signal components thereof having frequencies greater than the lowest frequency significantly contained in said frequency modulated signal, means for adding together said filtered input signal and said frequency modulated signal thereby to produce a composite signal, and means for varying the intensity of a beam of light exposing said film in accordance with the magnitude of said composite signal.

References Cited in the file of this patent

UNITED STATES PATENTS

| | | |
|---|---|---|
| 2,617,891 | Karolous et al. | Nov. 11, 1952 |
| 2,769,028 | Webb | Oct. 30, 1956 |
| 3,024,442 | Lash | Mar. 6, 1962 |
| 3,084,224 | Sanford | Apr. 2, 1963 |